United States Patent
Singer et al.

(10) Patent No.: US 11,091,656 B2
(45) Date of Patent: Aug. 17, 2021

(54) PACKAGING COATED WITH AN EMULSION POLYMERIZED LATEX POLYMER

(71) Applicant: PPG Industries Ohio, Inc., Cleveland, OH (US)

(72) Inventors: Debra L. Singer, Wexford, PA (US); Dary Duhamel, Stratford (GB); Kam Lun Lock, Orpington (GB); Qin Li, Mason, OH (US); Hanzhen Bao, Mason, OH (US); John M. Dudik, Apollo, PA (US); Edward R. Millero, Jr., Gibsonia, PA (US); William H. Retsch, Jr., Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 318 days.

(21) Appl. No.: 15/577,941

(22) PCT Filed: May 26, 2016

(86) PCT No.: PCT/US2016/034276
§ 371 (c)(1),
(2) Date: Nov. 29, 2017

(87) PCT Pub. No.: WO2016/196174
PCT Pub. Date: Dec. 8, 2016

(65) Prior Publication Data
US 2018/0171169 A1    Jun. 21, 2018

Related U.S. Application Data

(60) Provisional application No. 62/168,040, filed on May 29, 2015, provisional application No. 62/168,134, filed on May 29, 2015.

(51) Int. Cl.
| | | |
|---|---|---|
| C09D 7/61 | (2018.01) | |
| C08K 5/42 | (2006.01) | |
| C08K 5/5333 | (2006.01) | |
| C09D 5/02 | (2006.01) | |
| C09D 123/08 | (2006.01) | |
| C09D 133/06 | (2006.01) | |
| C09D 133/10 | (2006.01) | |
| C09D 133/12 | (2006.01) | |
| C09D 133/14 | (2006.01) | |
| C08K 3/32 | (2006.01) | |
| B65D 17/00 | (2006.01) | |
| C08K 5/06 | (2006.01) | |

(52) U.S. Cl.
CPC .............. C09D 7/61 (2018.01); C08K 5/42 (2013.01); C08K 5/5333 (2013.01); C09D 5/02 (2013.01); C09D 123/0869 (2013.01); C09D 133/06 (2013.01); C09D 133/10 (2013.01); C09D 133/12 (2013.01); C09D 133/14 (2013.01); B65D 17/02 (2013.01); C08K 3/32 (2013.01); C08K 5/06 (2013.01); *C08K 2003/329* (2013.01)

(58) Field of Classification Search
CPC ...... C09D 7/61; C09D 5/02; C09D 123/0869; C09D 133/06; C09D 133/10; C09D 133/12; C09D 133/14; C08K 5/42; C08K 5/5333; C08K 3/32; C08K 5/06; C08K 2003/329; B65D 17/02
USPC ........................................ 106/218
See application file for complete search history.

(56) References Cited

U.S. PATENT DOCUMENTS

| | | | | |
|---|---|---|---|---|
| 2012/0118785 A1* | 5/2012 | Kainz | ................... | B65D 25/14 |
| | | | | 206/524.3 |
| 2013/0149453 A1* | 6/2013 | Romick | ............... | C09D 151/06 |
| | | | | 427/385.5 |
| 2015/0337140 A1* | 11/2015 | Romick | ................... | C09D 5/08 |
| | | | | 428/413 |

FOREIGN PATENT DOCUMENTS

| | | |
|---|---|---|
| EP | 1777241 A1 | 4/2007 |
| WO | 9951696 | 10/1999 |
| WO | 2006045017 | 4/2006 |
| WO | 2015002958 | 1/2015 |
| WO | 2015002961 * | 1/2015 |
| WO | 2016105502 | 6/2016 |
| WO | 2016105504 | 6/2016 |

* cited by examiner

*Primary Examiner* — Ling Siu Choi
*Assistant Examiner* — Ronald Grinsted
(74) *Attorney, Agent, or Firm* — Diane R. Meyers

(57) ABSTRACT

A package with a coating composition deposited on at least a portion thereof is disclosed. The coating composition comprises: (a) a latex polymer comprising the emulsion polymerization product of (i) an emulsion monomer component comprising at least one ethylenically unsaturated monomer polymerized in the presence of (ii) a surfactant that is polymerizable with the at least one ethylenically unsaturated monomer. Also disclosed is a method for applying the coating composition to the package.

27 Claims, No Drawings

PACKAGING COATED WITH AN EMULSION POLYMERIZED LATEX POLYMER

CROSS-REFERENCE TO RELATED APPLICATIONS

The present application claims priority to U.S. Provisional Patent Application Ser. No. 62/168,040, filed on May 29, 2015, the entirety of which is incorporated by reference, and to U.S. Provisional Patent Application Ser. No. 62/168,134, filed on May 29, 2015, the entirety of which is incorporated by reference.

FIELD OF THE INVENTION

The present invention relates to a package coated at least in part with a coating comprising an emulsion polymerized latex polymer prepared from a polymerizable surfactant and an emulsion monomer, and optionally a phosphorus acid.

BACKGROUND OF THE INVENTION

The application of various polymeric coatings to metallic substrates, including metal food and beverage containers, to retard or inhibit corrosion is well established. Coatings are applied to the interior of such containers to prevent the contents from contacting the metal of the container. Contact between the metal and the food or beverage can lead to corrosion of the metal container, which can then contaminate the food or beverage. This is particularly true when the contents of the container are acidic in nature, such as tomato-based products and soft drinks.

Certain coatings, particularly in the packaging industry, must undergo extreme stresses in the course of preparation and use of the packaging containers. In addition to flexibility, packaging coatings may also need resistance to chemicals, solvents, and pasteurization processes used in the packaging of beer and other beverages, and may also need to withstand retort conditions commonly employed in food packaging. In addition to corrosion protection, coatings for food and beverage containers should be non-toxic, and should not adversely affect the taste of the food or beverage in the can. Resistance to "popping", "blushing" and/or "blistering" may also be desired.

Bisphenol A ("BPA") contributes to many of the properties desired in packaging coating products. The use of BPA and related products such as bisphenol A diglycidyl ether ("BADGE"), however, has recently come under scrutiny in the packaging industry. Substantially BPA-free coatings having properties comparable to coatings comprising BPA are therefore desired. The packaging industry is also interested in eliminating or minimizing other monomers, such as styrene, and components, such as formaldehyde, in coatings.

SUMMARY OF THE INVENTION

The present invention provides a package with a coating composition deposited on at least a portion thereof wherein the coating composition comprises:
  (a) a latex polymer comprising the emulsion polymerization product of
    (i) an emulsion monomer component comprising at least one ethylenically unsaturated monomer polymerized in the presence of
    (ii) a surfactant that is polymerizable with the at least one ethylenically unsaturated monomer.
The present invention also provides a method comprising:
  (a) applying the coating composition described above to a substrate prior to or after forming the substrate into a package; and
  (b) heating the coated substrate to a temperature and for a time sufficient to cure the coating composition.

DETAILED DESCRIPTION OF THE INVENTION

As used herein, the term "aliphatic group" means a saturated or unsaturated linear or branched hydrocarbon group. The term "alkyl group" means a saturated linear or branched hydrocarbon group including, for example, methyl, ethyl, isopropyl, t-butyl, heptyl, dodecyl, octadecyl, amyl, 2-ethylhexyl, and the like.

The term "alkenyl group" means an unsaturated linear or branched hydrocarbon group with one or more carbon-carbon double bonds such as vinyl group

(meth)allyl group

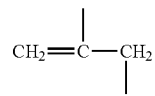

and (meth)acryl group

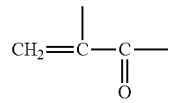

The term "aromatic group" means a closed ring hydrocarbon group with sigma bonds and delocalized pi electrons between carbon atoms forming the ring and which can include heteroatoms.

A group that may be the same or different is referred to as being "independently" something.

Substitution is anticipated on the alkyl, alkenyl and aromatic groups of the compounds of the present invention. Thus, when the term "group" is used to describe a chemical material, the described chemical material includes the unsubstituted group and that group substituted with O, N, Si, or S atoms. For example, the phrase "alkyl group" is intended to include not only pure open chain saturated hydrocarbon alkyl substituents, such as methyl, ethyl, propyl, t-butyl, and the like, but also alkyl substituents bearing further substituents known in the art, such as hydroxy, alkoxy, alkylsulfonyl, halogen atoms, cyano, nitro, amino, carboxyl, etc. Thus, "alkyl group" includes ether groups, haloalkyls, nitroalkyls, carboxyalkyls, hydroxyalkyls, sulfoalkyls, etc.

The term "crosslinker" or "curing agent" refers to a molecule capable of forming a covalent linkage between polymers or between two different regions of the same polymer.

The term "dispersed in aqueous medium" means that a polymer or the resinous components of the coating composition used in the practice of the invention can be mixed into aqueous medium to form a stable mixture, that is, the mixture does not separate into immiscible layers within an hour after mixing.

The term "aqueous medium" means water or a mixture of water and organic solvent.

The term "resinous components" means the polymers, crosslinkers and non-volatile organic components of the coating composition that may be used in the practice of the invention.

The term "resin solids" means the non-volatile organic components of the coating composition.

The term "food-contacting surface" refers to the surface of a container such as an inner surface of a food or beverage container that is in contact with, or intended for contact with, a food or beverage product. By way of example, an interior surface of a metal substrate of a food or beverage container, or a portion thereof such as a can end or a can body, is a food-contacting surface even if the interior metal surface is coated with a coating composition.

The term "on", when used in the context of a coating applied on a surface or substrate, includes both coatings applied directly or indirectly to the surface or substrate. Thus, for example, a coating applied to a primer layer overlying a substrate constitutes a coating applied on the substrate.

Unless otherwise indicated, the term "polymer" includes both homopolymers and copolymers (e.g., polymers of two or more different monomers) and oligomers. Resin is used simultaneously with polymer.

Acrylic and methacrylic monomers and polymers are designated as (meth)acrylic monomers and polymers.

Molecular weights are on a number average or weight average basis as indicated and are determined by gel permeation chromatography using tetrahydrofuran as a solvent and using polystyrene standards.

As used herein, unless otherwise expressly specified, all numbers such as those expressing values, ranges, amounts or percentages may be read as if prefaced by the word "about", even if the term does not expressly appear. Singular encompasses plural and vice versa. For example, although reference is made herein to "a" polymeric surfactant, "an" emulsion polymerized latex or "an" emulsion polymerized latex polymer, "a" latex, "a" latex polymer, "an" emulsion monomer, "a" phosphorus acid, one or more of each of these and any other components can be used. "Including", "for example", "such as" and like terms means including, for example, such as, but not limited to.

The term "reactive surfactant" or "polymerizable surfactant" means any surfactant that has the ability to react with the emulsion monomer component, such as, for example, by formation of a covalent bond. Typically, the reaction between the polymerizable surfactant and the latex particle surface is sufficiently strong to prevent separation and migration therebetween.

The term "non-reactive surfactant" means a surfactant that is adsorbed (as opposed to fixed or reacted) onto the surface of the latex particle. During high-speed metal can coating operations, non-reactive surfactants are typically desorbed or stripped off of the latex particle surface.

The term "emulsion monomer component" means one or more ethylenically unsaturated monomer(s) that are reactive with the polymerizable surfactant using emulsion polymerization techniques.

The term "emulsion polymerization" means free radical polymerization of ethylenically unsaturated monomer(s) and surfactant dispersed in aqueous medium.

The term "latex" or "latex polymer" means the polymer resulting from emulsion polymerization.

The polymerizable surfactant used in the preparation of the emulsion polymerized latex polymer can be any surfactant containing an alkenyl group capable of polymerizing with the emulsion monomer component; that is, the surfactant has at least one moiety that can undergo polymerization with at least one ethylenically unsaturated monomer. The polymerizable surfactant can be polymeric and may have an ionic and nonionic portion. The ionic portion can be, for example, an acid salt, an amine salt and the like. Suitable acid salt functionality can include, for example, phosphonate functionality, sulfonate functionality, and/or carboxylate functionality. The nonionic portion can be aliphatic or aromatic. It may be desired to use a polymerizable surfactant having a nonionic portion that is generally resistant to hydrolysis. Suitable polymerizable surfactants can also be solely nonionic or solely ionic. The polymerizable surfactant can have a weight average molecular weight ("Mw") of at least 200, such as at least 400 or at least 500 or as high as 5,000 or lower, such as 2,000 or lower or 1,000 or lower. The Mw can be, for example, 250 to 850, such as 500 to 700.

The polymerizable surfactant used according to the present invention becomes polymerized into the polymeric matrix during latex formation. This distinguishes the present invention from use of surfactants that are not capable of reacting with the emulsion monomers; such surfactants are therefore able to "move around" in the latex, such as by migrating to the surface of the coating. This migration is highly undesirable, particularly for packaging applications. In contrast, the polymerizable surfactants of the present invention polymerize into the latex, which minimizes the ability of the surfactant to migrate after cure of the coating. This makes the present coatings particularly suitable for packaging coatings, as the migration of surfactant into food or beverage or personal care products is minimized.

The polymerization of the surfactant into the latex may also contribute to the flexibility of coatings made from the present latex, although the inventors do not wish to be bound by this. For example, coatings used according to the present invention can have a flexibility as identified by wedge bend testing of 90% or greater or 95% or greater. This is further described in the example section, below.

Like non-reactive surfactants, reactive or polymerizable surfactants are molecules that typically have a hydrophobic segment, such as $C_8$ to $C_{50}$ alkyl, and a hydrophilic segment(s) such as an ionic salt group and/or poly(oxyethylene) groups (ethoxy hydrophobicity). The hydrophobic segment preferentially absorbs onto the surface of the latex particle during and following particle polymerization. The hydrophilic group extends into the normally aqueous solution phase and thereby provides a steric barrier against particle coagulation. Unlike their non-reactive counterparts, reactive surfactants contain a reactive group, typically an alkenyl group, on the hydrophobic segment that is capable of covalently bonding to the latex surface. The length and composition of the hydrophobic segment of the reactive surfactant is selected to substantially correspond to the surface chemistry and the rheological needs of the latex particle. The ionic groups may be anionic or cationic. Suitable anionic functional groups include, for example, sulfonate, phosphonate, and carboxylate ions. Suitable cationic functional groups include, for example, ammonium ions. A representative ionic reactive surfactant for such a reaction is MAXEMUL™ 6106 (available from Uniquema), which has both phosphonate and ethoxy hydrophilicity, and a nominal $C_{18}$ alkyl chain with an alkenyl reactive group.

Another representative reactive surfactant with ionic groups and with ethoxy hydrophilicity is Reasoap SR10 containing sulfonate and ethoxy hydrophilicity and a $C_{15}$ to $C_{18}$ alkyl chain with an allyl functional group.

The hydrophilicity of nonionic reactive surfactants is typically that provided by poly(oxyethylene) groups.

Examples of alkenyl-functional nonionic surfactants are ethoxylated unsaturated fatty alcohol esters such as the methyl ester of ethoxylated oleic alcohol, specifically, MAXEMUL 5110 that contains 24 units of ethylene oxide and MAXEMUL 5112 that contains 32 units of ethylene oxide. Other examples are nonyl phenoxy poly(ethyleneoxy) crotanate, nonyl phenoxy poly(ethyleneoxy) fumarate, nonyl phenoxy poly(ethyleneoxy) acrylate, and nonyl phenoxy poly(ethyleneoxy) methacrylate.

Further alkenyl-functional nonionic surfactants include cetyl polyethoxylated methacrylate (CEM), stearyl polyethoxylated (meth)acrylate, arachidyl polyethoxylated (meth)acrylate, behenyl polyethoxylated methacrylate (BEM), melissyl polyethoxylated (meth)acrylate and lacceryl polyethoxylated (meth)acrylate, where the polyethoxylated portion of the monomer comprises about 5 to about 250, such as about 15 to about 40, and about 15 to about 60 ethylene oxide repeating units.

Structurally, the polymerizable surfactant typically is of the structure:

$$R_1-CH=\overset{R_1}{\underset{R_2}{C}}-(A)_m-(CH)_n-(O)_p-(R_3-O)_q-X$$

where $R_1$ is independently H, $C_1$ to $C_{30}$ alkyl group, $$-\underset{O}{\overset{\parallel}{C}}-OR_4$$

where $R_4$ is $C_1$ to $C_{30}$ alkyl,
A is
Ar, $$-CH_2-\underset{O}{\overset{\parallel}{C}}-O-,\quad -\underset{O}{\overset{\parallel}{C}}-O-,\quad -O-,$$
$$-CH_2-O-,\quad -CH_2-O-CH_2- \text{ or } Ar,$$

or
Ar is a divalent aromatic group,
m is 0 to 1,
$R_2$ is H, an alkyl group containing at least 8 carbon atoms,
n is 0 to 30,
p is 0 to 1,
q is 2 to 250,
$R_3$ is —$C_2H_4$—, including mixtures with —$C_3H_7$—, and
X is an ionic salt group or an alkyl group.

More specifically, the polymerizable surfactant can be of the above structure, where
$R_1$ is independently H or $CH_3$,
A is —$CH_2$—O—$CH_2$—,
m is 1,
$R_2$ is an alkyl group containing at least 8 carbon atoms,
n is 1,
p is 1,
$R_3$ is —$C_2H_4$—,
q is 2 to 30, and
X is sulfonate or phosphonate.

Also, the polymerizable surfactant can be of the above structure, where
$R_1$ is independently H or $CH_3$,
A is $$R_4-\overbenzene$$

Where $R_4$ is an alkyl group having at least 8 carbon atoms,
m is 1,
n is 0,
p is 1,
$R_3$ is —$C_2H_4$—,
q is 2 to 40, and
X is sulfonate or phosphonate.

Further, the polymerizable surfactant can be of the above structure, where
$R_1$ is independently H or $CH_3$,
A is —$CH_2$—O—,
m is 1,
$R_2$ is an alkyl group having at least 8 carbon atoms,
n is 1,
p is 1,
$R_4$ is —$C_2H_4$—,
q is 2 to 40, and
X is sulfonate or phosphonate.

In addition, the polymerizable surfactant can be of the above structure, where
$R_1$ is independently H or $C_1$ to $C_{30}$ alkyl,
m is 0,
$R_2$ is H,
n is 6 to 10,
p is 1,
q is 5 to 40,
$R_3$ is —$C_2H_4$—, and
X is $C_1$ to $C_4$ alkyl.

The polymerizable surfactant is present in the coating composition in amounts of 0.1 to 25, such as 0.5 to 15 percent by weight based on resin solids weight of the emulsion monomer component and the polymerizable surfactant.

The nonionic surfactants are typically used in combination with anionic surfactants to provide stable latexes. Examples of anionic surfactants are those mentioned above as well as non-reactive anionic surfactants. Examples of non-reactive anionic surfactants include alkali metal and ammonium salts of long chain alkyl sulfates, sulfonates and sulfosuccinates; alkali metal and ammonium phosphate esters and alkali metal and ammonium alkyl phenoxy polyethoxysulfates, sulfonates or phosphates in which the alkyl group contains 4 to 18 carbon atoms and the oxyethylene units range from 6 to 60. Examples of specific anionic surfactants include sodium lauryl sulfate, sodium cetyl sulfate, sodium dioctyl sulfosuccinate and ammonium nonyl phenoxy (polyethoxy)$_{6-60}$ sulfonate. When used, the non-reactive surfactant is present in the coating composition in amounts of 0.1 to 5.0, such as 0.5 to 3.0 percent by weight based on resin solids weight of polymerizable surfactant and emulsion monomer.

The polymerizable surfactant is used in conjunction with the emulsion monomer component comprising at least one ethylenically unsaturated monomer. According to the present invention, use of a keto aldehyde monomer can be specifically excluded. The emulsion monomer component can be free of styrene and/or epoxy group-containing ethylenically unsaturated monomer.

The emulsion monomer component can be a mixture of monomers and/or oligomers that are capable of free radical initiated polymerization in aqueous medium.

Suitable ethylenically unsaturated monomers and/or oligomers for inclusion in the ethylenically unsaturated monomer component include, for example, ethylenically unsaturated alkyl (meth)acrylates, epoxy-containing ethylenically unsaturated monomers and various vinyl monomers. Examples of ethylenically unsaturated acid are acrylic and methacrylic acid. If used, they are typically present in amounts of up to 10, such as 3 to 8 percent by weight based on weight of the emulsion monomer component.

Suitable alkyl(meth)acrylates include, but are not limited to, methyl (meth)acrylate, ethyl(meth)acrylate, propyl (meth)acrylate, isopropyl (meth)acrylate, butyl(meth)acrylate, isobutyl(meth)acrylate, pentyl(meth)acrylate, isoamyl (meth)acrylate, hexyl(meth)acrylate, 2-ethylhexyl(meth) acrylate, cyclohexyl(meth)acrylate, decyl(meth)acrylate, isodecyl(meth)acrylate, benzyl (meth)acrylate, lauryl(meth) acrylate, isobornyl(meth)acrylate, octyl(meth)acrylate and nonyl(meth)acrylate.

The alkyl (meth)acrylates are typically present in amounts of up to 100, such as 20 to 80 percent by weight based on weight of the emulsion monomer component.

Hydroxyalkyl (meth)acrylates can also be used. Examples include hydroxyethyl acrylate (HEA), hydroxyethyl methacrylate (HEMA) and hydroxypropyl(meth)acrylate (HPMA).

The hydroxyalkyl (meth)acrylates are typically present in amounts of up to 30 percent, such as 5 to 15 percent by weight based on weight of the emulsion monomer component.

Difunctional (meth)acrylate monomers may be used in the monomer mixture as well. Examples include ethylene glycol di(meth)acrylate, 1,6-hexanediol di(meth)acrylate, allyl methacrylate, and the like. If present, the difunctional (meth) acrylate monomers are present in amounts of up to 5 percent, such as 0.1 to 2 percent by weight based on weight of the emulsion monomer component.

Also, epoxy-containing ethylenically unsaturated monomers such as glycidyl (meth)acrylate can be present in the ethylenically unsaturated monomer component. If present, it is present in amounts of up to 30, such as 1 to 20 percent by weight based on weight of the ethylenically unsaturated monomer component.

Suitable vinyl monomers include vinyl aromatic monomers, styrene, methyl styrene, alpha-methylstyrene, halostyrene, vinyl toluene, vinyl naphthalene, and mixtures thereof. The ethylenically unsaturated monomer component may be free of styrene monomers. Other vinyl monomers include vinyl ester, vinyl acetate, vinyl propionate, vinyl butyrate and vinyl stearate. The vinyl monomers, if used, are typically present in amounts of up to 70 percent, such as 10 to 60 percent by weight based on total weight of the emulsion monomer component.

Other suitable polymerizable ethylenically unsaturated monomers include acrylonitrile, acrylamide, methacrylamide, methacrylonitrile, N-isobutoxymethyl acrylamide, N-butoxymethyl acrylamide, conjugated butadiene and isoprene, and mixtures thereof, and which may be present in amounts of up to 30, such as 3 to 20 percent by weight based on total weight of the emulsion monomer component.

The emulsion monomer component can be present in amounts of 75 to 99.9, such as 85 to 99.5 percent by weight based on weight of the ethylenically unsaturated monomer component and the reactive polymerizable surfactant.

The coating composition can optionally contain polyolefin base polymers functionalized with a polar group such as an acid group, such as polypropylene or polyethylene homopolymer or copolymer in which the polymer has been modified with carboxylic acid.

Exemplary polyolefins include, but are not limited to, one or more thermoplastic polyolefin homopolymers or copolymers of one or more alpha-olefins such as ethylene, propylene, 1-butene, 3-methyl-1-butene, 4-methyl-1-pentene, 3-methyl-1-pentene, 1-heptene, 1-hexene, 1-octene, 1-decene, and 1-dodecene, as typically represented by polyethylene, polypropylene, poly-1-butene, poly-3-methyl-1-butene, poly-3-methyl-1-pentene, poly-4-methyl-1-pentene, ethylene-propylene copolymer, ethylene-1-butene copolymer, and propylene-1-butene copolymer. Such exemplary polyolefins may have a molecular weight of greater than 800 grams/mole; for example, greater than 5,000 grams/mole; or in the alternative, greater than 50,000 grams/mole.

The base polymers mentioned above comprise a polar group as either a comonomer or grafted monomer. Exemplary polar polyolefins include, but are not limited to, maleic anhydride grafted polyethylene homopolymer or copolymer, maleic anhydride grafted polypropylene homopolymer or copolymer, ethylene-acrylic acid (EAA) and ethylene-methacrylic acid copolymers, such as those available under the trademarks PRIMACOR™ commercially available from The Dow Chemical Company, NUCREL™, commercially available from E.I. DuPont de Nemours, and ESCOR™ commercially available from ExxonMobil Chemical Company and described in U.S. Pat. Nos. 4,599,392; 4,988,781 and 5,938,437.

The polar polyolefin polymer such as an ethylene-acrylic acid (EAA) or ethylene-methacrylic acid copolymer can be present with the reactive surfactant when the ethylenically unsaturated monomer component is polymerized in the presence of the reactive surfactant, or alternatively, all or a portion thereof may be added to the coating composition after polymerization of the ethylenically unsaturated monomer component. The polar polyolefin is typically at least partially neutralized with ammonia or an organic amine.

The polar polyolefin provides enhanced flexibility to the cured coating, which is particularly desirable in coatings for metal can ends and for can bodies that are formed by a deep drawing process. The polar polyolefins are typically present in the coating composition in amounts of 5 to 50, such as 20 to 40 percent by weight based on total weight of resin solids.

The emulsion polymerized latex of the present invention can be prepared according to methods known in the art. For example, the ethylenically unsaturated monomer component can be emulsified with the polymerizable surfactant in aqueous medium and the emulsion fed into pre-heated aqueous medium with an initiator.

With regard to the conditions of the emulsion polymerization, the ethylenically unsaturated monomer component can be polymerized in aqueous medium with a water-soluble free radical initiator in the presence of the reactive surfactant.

The temperature of polymerization is typically from 0° C. to 100° C., such as 70° C. to 90° C. The pH of the aqueous medium is usually maintained at a pH of 5 to 12.

The free radical initiator can be selected from one or more water-soluble peroxides which are known to act as free radical initiators. Examples include hydrogen peroxide and t-butyl hydroperoxide. Redox initiator systems well known in the art (e.g., t-butyl hydroperoxide, erythorbic acid, and ferrous complexes) can also be employed. Persulfate initiators such as ammonium persulfate or potassium persulfate can be used but may lead to poor water resistance properties of the cured coating.

Further examples of polymerization initiators which can be employed include polymerization initiators which thermally decompose at the polymerization temperature to generate free radicals. Examples include both water-soluble and water-insoluble species. Further examples of free radical initiators that can be used include persulfates, such as ammonium or alkali metal (potassium, sodium or lithium) persulfate; azo compounds such as 2,2'-azo-bis(isobutyronitrile), 2,2'-azo-bis(2,4-dimethylvaleronitrile), and 1-t-butyl-azocyanocyclohexane; hydroperoxides such as t-butyl hydroperoxide, hydrogen peroxide, t-amyl hydroperoxide, methyl hydroperoxide, and cumene hydroperoxide; peroxides such as benzoyl peroxide, caprylyl peroxide, di-t-butyl peroxide, ethyl 3,3'-di(t-butylperoxy) butyrate, ethyl 3,3'-di (t-amylperoxy) butyrate, t-amylperoxy-2-ethyl hexanoate, and t-butylperoxy pivilate; peresters such as t-butyl peracetate, t-butyl perphthalate, and t-butyl perbenzoate; as well as percarbonates, such as di(1-cyano-1-methylethyl)peroxy dicarbonate; perphosphates, and the like; and combinations thereof.

Polymerization initiators can be used alone or as the oxidizing component of a redox system, which also may include a reducing component such as ascorbic acid, malic acid, glycolic acid, oxalic acid, lactic acid, thioglycolic acid, or an alkali metal sulfite, more specifically a hydrosulfite, hyposulfite or metabisulfite, such as sodium hydrosulfite, potassium hyposulfite and potassium metabisulfite, or sodium formaldehyde sulfoxylate, and combinations thereof.

The initiator and accelerator can be used in proportion from about 0.001% to 5% each, based on the weight of monomers and reactive surfactant to be copolymerized.

Chain transfer agents can be used to control polymer molecular weight, if desired.

The polymerization reaction of the ethylenically unsaturated monomer component in the presence of the reactive surfactant may be conducted as a batch, intermittent, or continuous operation. While all of the polymerization ingredients may be charged initially to the polymerization vessel, better results normally are obtained with proportioning techniques.

Typically, the reactor is charged with an appropriate amount of water, free radical initiator and optionally a portion of reactive surfactant. The reactor is then heated to the free radical initiation temperature and then charged with the emulsified ethylenically unsaturated monomer component. Only water, initiator, reactive surfactant, and some portion of the ethylenically unsaturated monomer component may be initially charged to the vessel. There may also be some water-miscible solvent present. After this initial charge is allowed to react for a period of time at polymerization temperature, the remaining emulsified ethylenically unsaturated monomer component can be added incrementally with the rate of addition being varied depending on the polymerization temperature, the particular initiator being employed, and the type and amount of monomers being polymerized. After all the monomer component has been charged, a final heating is carried out to complete the polymerization. The reactor is then cooled and the latex recovered.

The average particle size of the latex particles can be 0.05 micron, or greater such as at 0.08 micron or greater or 0.1 micron or greater, and can be up to 1.0 micron or less, such as 0.5 micron or less or 0.2 micron or less. The average particle size can range, for example, from 0.05 to 1.0 micron, such as 0.1 to 0.5 micron, 0.1 to 0.2 micron, or 0.08 to 0.2 micron. The Mw of these particles as measured by gel permeation chromatography in tetrahydrofuran can be, for example, 50,000 or greater, such as 100,000 or greater or 400,000 or greater, and can be 1,000,000 or less, such as 800,000 or less or 650,000 or less. The average Mw of these particles can range, for example, from 50,000 to 1,000,000, such as 100,000 to 800,000 or 400,000 to 650,000. Higher Mw may increase flexibility and/or resistance of the film coating. Any values within these broad ranges are also within the scope of the present invention, as are higher or lower numbers. Theoretical Tg values (Fox Equation) for the latex can be as low as −20° C. or greater, such as 5° C. or greater or 25° C. or greater and as high as 100° C. or lower, such as 80° C. or lower or 40° C. or lower. The Tg can range, for example, from −20° C. to 100° C., such as 25° C. to 80° C. or 5° C. to 40° C.

The coating compositions used according to the present invention can comprise, for example, 10 percent by weight of the latex polymer or greater, such as 20 percent by weight or greater or 50 percent by weight or greater, and as much as 100 percent by weight or less, such as 95 percent by weight or less or 90 percent by weight or less; the amount of latex polymer can range, for example, from 10 to 100 percent by weight, such as 20 to 95 percent by weight or 50 to 95 percent by weight, with weight percent based on the total resin solids weight of the coating composition.

It has been discovered that coating compositions using the aforementioned latexes that contain reactive functional groups such as hydroxyl and carboxylic acid may be formulated using one or more optional curing agents (i.e., crosslinking resins, sometimes referred to as "crosslinkers"). The choice of particular crosslinker typically depends on the reactive functional group of the latex polymer and particular product being formulated.

Any of the well known curing resins for packaging coatings can be used. For example, phenoplast, and aminoplast curing agents may be used.

Phenoplast resins include the condensation products of aldehydes with phenols. Formaldehyde and acetaldehyde are particularly suitable aldehydes. Various phenols can be employed such as phenol, cresol, p-phenylphenol, p-tert-butylphenol, p-tert-amylphenol, and cyclopentylphenol.

Aminoplast resins are the condensation products of aldehydes such as formaldehyde, acetaldehyde, crotonaldehyde, and benzaldehyde with amino or amido group-containing substances such as urea, melamine, and benzoguanamine.

Examples of suitable crosslinking resins include, without limitation, benzoguanamine-formaldehyde resins, melamine-formaldehyde resins, esterified melamine-formaldehyde, and urea-formaldehyde resins. One specific example of a useful crosslinker is a highly alkylated melamine-formaldehyde resin commercially available from Allenex under the trademark of CYMEL 303.

The crosslinker, when present, may be selected from hydroxyalkylamide materials and hydroxyalkylurea materials. Hydroxyalkylamides are typically of the structure:

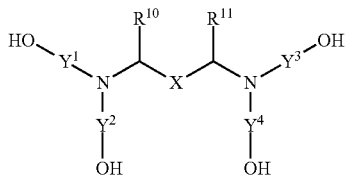

wherein $R^{10}$ and $R^{11}$ each, independently, represent an electron withdrawing group, such as carbonyl;

$Y^1$, $Y^2$, $Y^3$ and $Y^4$ each, independently, represent a $C_1$ to $C_3$ alkylene group; and X represents a $C_2$ to $C_6$ alkylene group.

Suitably, each of $Y^1$, $Y^2$, $Y^3$ and $Y^4$ represent an ethylene group.

Suitably, X represents a butylene group.

The crosslinker material may comprise a commercially available beta-hydroxyalkylamide crosslinker, such as, for example, PRIMID XL-552, i.e., N,N,N',N'-tetrakis(2-hydroxypropyl)adipamide, and PRIMID QM-1260 (available from EMS Chemie).

The crosslinker material may comprise a hydroxyalkylurea material. Suitable hydroxyalkylureas are those of the structure:

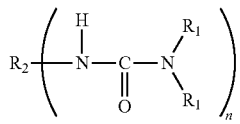

wherein $R_2$ is a substituted or unsubstituted $C_1$ to $C_{36}$ alkyl group, an aromatic group, the residue of an isocyanurate, biuret, allophanate, glycoluril, benzoguanamine and/or polyether amine; wherein each $R_1$ is independently a hydrogen, an alkyl having at least 1 carbon atom, or a hydroxy functional alkyl having 2 or more carbon atoms and at least one $R_1$ is hydroxyalkyl having 2 or more carbon atoms; and n is 2 to 6.

The level of curing agent (i.e., crosslinker) required will depend on the type of curing agent, the time and temperature of the bake, and the molecular weight of the polymer. If used, the crosslinker is typically present in amounts of 2 to 50, such as 5 to 40 percent by weight. These weight percentages are based upon the total weight of the resin solids in the coating composition.

Optionally the coating composition may contain a phosphorus acid. It has been surprisingly discovered that use of phosphorus acid in the coatings of the present invention allow for cure using a significantly reduced amount of crosslinker, such as those based on formaldehyde, i.e., phenolplast and aminoplast, or even without the use of crosslinker at all, thereby resulting in a composition that is free of formaldehyde, that is, release of formaldehyde during curing. The phosphorus acid can be used in any amount, such as 0.01 wt % or greater, 0.05 wt % or greater or 0.1 wt % or greater and can be used in amounts less than 5 wt %, less than 1 wt % or less than 0.05%, based on total solid such as resin solids weight of the coating. The phosphorus acid can be phosphoric acid used in an amount ranging from 0.1 to 1.0 percent by weight, based on the total weight of resin solids of the coating composition.

The phosphorus acid used in the present invention can be a phosphinic acid ($H_3PO_2$), a phosphonic acid ($H_3PO_3$) and/or a phosphoric acid ($H_3PO_4$). The phosphoric acid can be in the form of an aqueous solution, for example, an 85 percent by weight aqueous solution, or can be 100 percent phosphoric acid or super phosphoric acid. The phosphorus acid can also be diluted in a water miscible solvent. The amount of phosphorous acid in weight percent used in the present invention reflects the amount of acid itself, and not the combined amount of acid and solvent, if used.

A coating composition of the present invention may also include other optional polymers that do not adversely affect the coating composition or a cured coating composition resulting therefrom. Such optional polymers are typically included in a coating composition as a filler material, although they can be included to provide desirable properties. One or more optional polymers can be included in a sufficient amount to serve an intended purpose, but not in such an amount to adversely affect a coating composition or a cured coating composition resulting therefrom.

Such additional polymeric materials can be non-reactive, and hence, simply function as fillers. Such optional non-reactive filler polymers include, for example, polyesters, acrylics, polyamides and polyethers. Alternatively, such additional polymeric materials can be reactive with other components of the composition (e.g., the curing agent). If desired, reactive polymers can be incorporated into the compositions of the present invention, to provide additional functionality for various purposes, such as crosslinking. Examples of such reactive polymers include, for example, hydroxyl-functional polyesters and acrylic polymers. If present, these additional polymeric materials are present in amounts up to 20 percent by weight based on weight of resin solids of the coating composition.

A coating composition of the present invention may also include other optional ingredients that do not adversely affect the coating composition or a cured coating composition resulting therefrom. Such optional ingredients are typically included in a coating composition to enhance composition esthetics, to facilitate manufacturing, processing, handling, and application of the composition, and to further improve a particular functional property of a coating composition or a cured coating composition resulting therefrom.

Such optional ingredients include, for example, catalysts, lubricants, anticorrosion agents, flow control agents, thixotropic agents, dispersing agents, antioxidants, adhesion promoters, light stabilizers, and mixtures thereof. Each optional ingredient is included in a sufficient amount to serve its intended purpose, but not in such an amount to adversely affect a coating composition or a cured coating composition resulting therefrom. If present, these optional ingredients are present in amounts up to 10 percent by weight based on weight of resin solids of the coating composition.

As used herein, the term "colorant" means any substance that imparts color and/or other opacity and/or other visual effect to the composition. The colorant can be added to the coating in any suitable form, such as discrete particles, dispersions, solutions and/or flakes. A single colorant or a mixture of two or more colorants can be used in the coatings of the present invention. Suitable colorants are listed in U.S. Pat. No. 8,614,286, column 7, line 2 through column 8, line 65, which is incorporated by reference herein. Particularly suitable for packaging coatings are those approved for food contact, such as titanium dioxide; iron oxides, such as black iron oxide; carbon black; ultramarine blue; phthalocyanines, such as phthalocyanine blue and phthalocyanine green; chromium oxides, such as chromium green oxide; graphite fibrils; ferried yellow; quindo red; and combinations thereof, and those listed in Article 178.3297 of the Code of Federal Regulations, which is incorporated by reference herein.

In general, the colorant can be present in any amount sufficient to impart the desired visual and/or color effect. The colorant may comprise from 1 to 65 weight percent of the coatings in the present invention, such as from 3 to 40 weight percent or 5 to 35 weight percent, with weight percent based on the total weight of the coating composition.

In certain embodiments, the compositions used in the practice of the invention, are substantially free, may be essentially free and may be completely free of bisphenol A and derivatives or residues thereof, including bisphenol A ("BPA") and bisphenol A diglycidyl ether ("BADGE"). Such compositions are sometimes referred to as "BPA non intent" because BPA, including derivatives or residues thereof are not intentionally added but may be present in trace amounts because of unavoidable contamination from the environment. The compositions can also be substantially free and may be essentially free and may be completely free of Bisphenol F and derivatives or residues thereof, including bisphenol F and bisphenol F diglycidyl ether ("BPFG"). The term "substantially free" as used in this context means the compositions contain less than 1000 parts per million (ppm), "essentially free" means less than 100 ppm and "completely free" means less than 20 parts per billion (ppb) of any of the above mentioned compounds, derivatives or residues thereof.

As previously discussed, the coating composition of the invention can include water and may further include one or more optional organic solvents. Typically, the coating composition includes up to 40, such as 10 to 40 percent by weight organic solvent based on total weight of organic solvent and water.

The coating composition typically has a total solids content of from about 10 to about 70, such as about 20 to about 50 percent by weight based on weight of the coating composition.

Specifically, the coating composition has a resin solids content of 5 to 65, such as 15 to 45 percent by weight, the percentage by weight being based on total weight of the coating composition.

The coatings described herein are particularly suitable for use as a packaging coating. The application of various pretreatments and coatings to packaging is well established. Such treatments and/or coatings, for example, can be used in the case of metal cans, wherein the treatment and/or coating may be used, for example, to retard or inhibit corrosion, provide a decorative coating, provide ease of handling during the manufacturing process, and the like. Coatings can be applied to the interior of such cans to prevent the contents from contacting the metal of the container. Contact between the metal and a food or beverage, for example, can lead to corrosion of a metal container, which can then contaminate the food or beverage. This is particularly true when the contents of the can are acidic in nature. The coatings applied to the interior of metal cans also help prevent corrosion in the headspace of the cans, which is the area between the fill line of the product and the can lid; corrosion in the headspace is particularly problematic with food products having a high salt content. Coatings can also be applied to the exterior of metal cans. Certain coatings of the present invention are particularly applicable for use with coiled metal stock, such as the coiled metal stock from which the ends of cans are made ("can end stock"), and end caps and closures are made ("cap/closure stock"). Since coatings designed for use on can end stock and cap/closure stock are typically applied prior to the piece being cut and stamped out of the coiled metal stock, they are typically flexible and extensible. For example, such stock is typically coated on both sides. Thereafter, the coated metal stock is punched. For can ends, the metal is then scored for the "pop-top" opening and the pop-top ring is then attached with a pin that is separately fabricated. The end is then attached to the can body by an edge rolling process. A similar procedure is done for "easy open" can ends. For easy open can ends, a score substantially around the perimeter of the lid allows for easy opening or removing of the lid from the can, typically by means of a pull tab. For caps and closures, the cap/closure stock is typically coated, such as by roll coating, and the cap or closure stamped out of the stock; it is possible, however, to coat the cap/closure after formation. Coatings for cans subjected to relatively stringent temperature and/or pressure requirements may desirably also be resistant to cracking, popping, corrosion, blushing and/or blistering.

Accordingly, the present invention is directed to a package coated at least in part with any of the coating compositions described above. A "package" is anything used to contain another item, particularly for shipping from a point of manufacture to a consumer, and for subsequent storage by a consumer. A package will be therefore understood as something that is sealed so as to keep its contents free from deterioration until opened by a consumer. The manufacturer will often identify the length of time during which the food or beverage will be free from spoilage, which typically ranges from several months to years. Thus, the present "package" is distinguished from a storage container or bakeware in which a consumer might make and/or store food; such a container would only maintain the freshness or integrity of the food item for a relatively short period. A package according to the present invention can be made of metal or non-metal, for example, plastic or laminate, and be in any form. An example of a suitable package is a laminate tube. Another example of a suitable package is metal can. The term "metal can" includes any type of metal can, container or any type of receptacle or portion thereof that is sealed by the food/beverage manufacturer to minimize or eliminate spoilage of the contents until such package is opened by the consumer. One example of a metal can is a food can; the term "food can(s)" is used herein to refer to cans, containers or any type of receptacle or portion thereof used to hold any type of food and/or beverage. The term "metal can(s)" specifically includes food cans and also specifically includes "can ends" including "E-Z open ends", which are typically stamped from can end stock and used in conjunction with the packaging of food and beverages. The term "metal cans" also specifically includes metal caps and/or closures such as bottle caps, screw top caps and lids of any size, lug caps, and the like. The metal cans can be used to hold other items as well, including, but not limited to, personal care products, bug spray, spray paint, and any other compound suitable for packaging in an aerosol can. The cans can include "two-piece cans" and "three-piece cans" as well as drawn and ironed one-piece cans; such one-piece cans often find application with aerosol products. Packages coated according to the present invention can also include plastic bottles, plastic tubes, laminates and flexible packaging, such as those made from PE, PP, PET and the like. Such packaging could hold, for example, food, toothpaste, personal care products and the like.

The coating can be applied to the interior and/or the exterior of the package. For example, the coating can be rollcoated onto metal used to make a two-piece food can, a three-piece food can, can end stock and/or cap/closure stock. The coating can be applied to a coil or sheet by roll coating; the coating is then cured by heating or radiation and can ends are stamped out and fabricated into the finished product, i.e.

can ends. The coating can be applied as a rim coat to the bottom of the can; such application can be by roll coating. The rim coat functions to reduce friction for improved handling during the continued fabrication and/or processing of the can. The coating can be applied to caps and/or closures; such application can include, for example, a protective varnish that is applied before and/or after formation of the cap/closure and/or a pigmented enamel post applied to the cap, particularly those having a scored seam at the bottom of the cap. Decorated can stock can also be partially coated externally with the coating described herein, and the decorated, coated can stock used to form various metal cans. This is within the scope of the "package" according to the present invention.

The packages of the present invention can be coated with any of the compositions described above by any means known in the art, such as spraying, roll coating, dipping, flow coating and the like; the coating may also be applied by electrocoating when the substrate is conductive. The appropriate means of application can be determined by one skilled in the art based upon the type of package being coated and the type of function for which the coating is being used. The coatings described above can be applied over the substrate as a single layer or as multiple layers with multiple heating stages between the application of each layer, if desired. After application to the substrate, the coating composition may be cured by any appropriate means.

The coatings described herein can be applied to any packaging substrates, which can be metallic or non-metallic. Metallic substrates include tin, steel, tin-plated steel, chromium passivated steel, galvanized steel, aluminum, aluminum foil, coiled steel or other coiled metal. Non-metallic substrates including polymeric, plastic, polyester, polyolefin, polyamide, cellulosic, polystyrene, polyacrylic, poly (ethylene naphthalate), polypropylene, polyethylene, nylon, EVOH, polylactic acid, other "green" polymeric substrates, poly(ethyleneterephthalate) ("PET"), polycarbonate, polycarbonate acrylobutadiene styrene ("PC/ABS"), polyamide, glass, paper, cardboard, textiles, leather, both synthetic and natural, and the like. The substrate can be one that has been already treated in some manner, such as to impart visual and/or color effect.

The coatings can be applied to a dry film thickness of 0.04 mils or greater, such as 0.1 mil or greater or 0.7 mil or greater and up to 4 mils or less, such as 2 mils or less or 1.3 mils or less, with suitable ranges from 0.04 mils to 4 mils, such as 0.1 to 2 or 0.7 to 1.3 mils. For some applications, the coatings can be applied to a dry film thickness of 0.1 mils or greater, 0.5 mils or greater, 1.0 mils or greater, 2.0 mils or greater, 5.0 mils or greater, or even thicker. For packaging coatings, the dry film thickness can be, for example, 1.0 to 20 microns. The coatings of the present invention can be used alone, or in combination with one or more other coatings. For example, the coatings of the present invention can comprise a colorant or not and can be used as a primer, basecoat, and/or top coat. For substrates coated with multiple coatings, one or more of those coatings can be coatings as described herein. For example, a coating such as described herein can be spray applied as a top coat over a roller applied basecoat of a different composition for improvements in organoleptic performance.

EXAMPLES

The following examples are intended to illustrate the present invention and are not intended to limit the invention in any way.

Latex Preparation Examples

Latex A Made with Polymerizable Surfactant

A total of 14 grams of MAXEMUL 6106 (anionic surfactant commercially available from Croda) was added to an Erlenmeyer flask with 421 grams of deionized water and stirred well. A total of 98 grams of hydroxyethyl methacrylate, 349 grams of styrene, 644 grams of ethyl acrylate and 22 grams of methacrylic acid were added in order to the Erlenmeyer while mixing well. It was mixed until the monomer emulsion showed no separation upon standing. This is referred to below as the monomer premix.

A total of 1431 grams of deionized water was placed into a 5-liter, 4-neck round bottom flask equipped with a stirrer, water-cooled reflux condenser, two addition funnels and a thermocouple. The water was heated to 80° C. with stirring and under a nitrogen gas blanket. A total of 15 grams of the monomer premix was added to the reactor over 2 minutes. A total of 0.5 grams of ammonium persulfate dissolved in 5 grams of water was then added over 1 minute to the reactor. After 20 minutes, 4 grams of ammonium persulfate dissolved in 419 grams of water were added to the flask.

The remaining 1554 grams of the monomer premix and 4.4 grams of ammonium persulfate dissolved in 419 grams of water were added simultaneously to the flask over 150 minutes. At the end of the monomer feed the reaction was maintained at 80° C. for an additional 60 minutes. An aliquot of 4.5 grams of t-butyl peroctoate thinned with 22 grams of Dowanol PM (commercially available from Dow) were added over 5 minutes as a chase initiator to the reactor. The reaction was held with stirring for an additional 60 minutes at 80° C. It was then allowed to cool to <40° C. A total of 11 grams of dimethylethanolamine in 34 grams of water was added over about 5 minutes. The contents of the flask were filtered and filled out into a suitable container. The final latex had a measured solids of 33%, a surface weighted mean particle size of 121 nm, a Brookfield Viscosity of 33 centipoise (#4@60 rpm) and a bluish-white appearance. Unless otherwise indicated, viscosity is measured at 20° C.

Latex B Made with Polymerizable Surfactant

A total of 14 grams of MAXEMUL 6106 was added to an Erlenmeyer flask with 421 grams of deionized water and stirred well. A total of 45 grams of glycidyl methacrylate, 279 grams of styrene, 550 grams of ethyl acrylate and 18 grams of methacrylic acid were added on order to the Erlenmeyer while mixing well. It was mixed until the monomer emulsion showed no separation upon standing. This is the monomer premix.

A total of 1145 grams of deionized water was placed into a 5-liter, 4-neck round bottom flask equipped with a stirrer, water-cooled reflux condenser, two addition funnels and a thermocouple. The water was heated to 80° C. with stirring and under a nitrogen gas blanket. A total of 12 grams of the monomer premix was then added to the reactor over 2 minutes. A total of 0.39 grams of ammonium persulfate dissolved in 4 grams of water was added over 1 minute to the reactor. After 20 minutes, 4 grams of ammonium persulfate dissolved in 335 grams of water were added to the flask.

The remaining 1227 grams of the monomer premix and 3.5 grams of ammonium persulfate dissolved in 335 grams of water were added simultaneously to the flask over 150 minutes. At the end of the monomer feed the reaction was maintained at 80° C. for an additional 60 minutes. An aliquot of 3.6 grams of t-butyl peroctoate thinned with 18 grams of Dowanol PM were added over 5 minutes as a chase initiator to the reactor. The reaction was held with stirring for an additional 60 minutes at 80° C. It was then allowed to cool to <40° C. A total of 9 grams of dimethylethanolamine in 28 grams of water was added over about 5 minutes. The contents of the flask were filtered and filled out into a suitable container. The final latex had a measured solids of 33%, a surface weighted mean particle size of 109 nm, a Brookfield Viscosity of 36 centipoise (#4@60 rpm) and a bluish-white appearance.

Latex C Made with Polymerizable Surfactant

A total of 11 grams of MAXEMUL 6106 was added to an Erlenmeyer flask with 337 grams of deionized water and stirred well. A total of 45 grams of glycidyl methacrylate, 279 grams of methyl methacrylate, 550 grams of ethyl acrylate and 18 grams of methacrylic acid were added on order to the Erlenmeyer while mixing well. It was mixed until the monomer emulsion showed no separation upon standing. This is the monomer premix.

A total of 1147 grams of deionized water was placed into a 5-liter, 4-neck round bottom flask equipped with a stirrer, water-cooled reflux condenser, two addition funnels and a thermocouple. The water was heated to 80° C. with stirring and under a nitrogen gas blanket. A total of 12 grams of the monomer premix was then added to the reactor over 2 minutes. A total of 0.39 grams of ammonium persulfate dissolved in 4 grams of water was added over 1 minute to the reactor. After 20 minutes, 3.5 grams of ammonium persulfate dissolved in 335 grams of water were added to the flask.

The remaining 1227 grams of the monomer premix and 3.5 grams of ammonium persulfate dissolved in 335 grams of water were added simultaneously to the flask over 150 minutes. At the end of the monomer feed the reaction was maintained at 80° C. for an additional 60 minutes. An aliquot of 3.6 grams of t-butyl perocotate thinned with 18 grams of Dowanol PM were added over 5 minutes as a chase initiator to the reactor. The reaction was held with stirring for an additional 60 minutes at 80° C. It was then allowed to cool to <40° C. A total of 7 grams of dimethylethanolamine in 22 grams of water was added over about 5 minutes. The contents of the flask were filtered and filled out into a suitable container. The final latex had a measured solids of 33%, a surface weighted mean particle size of 111 nm, a Brookfield Viscosity of 32 centipoise (#4@60 rpm) and a bluish-white appearance.

Latex D Made with Ionic Polymerizable Surfactant

A total of 5.6 grams of MAXEMUL 6106 was added to an Erlenmeyer flask with 153 grams of deionized water and stirred well. A total of 23 grams of glycidyl methacrylate, 139 grams of methyl methacrylate, 221 grams of ethyl acrylate, 22 grams of methacrylic acid and 40 grams of hydroxyethyl methacrylate were added in order to the Erlenmeyer while mixing well. The contents were mixed until the monomer emulsion showed no sign of separation upon standing. This is the monomer premix.

A total of 724 grams of deionized water was placed into a 3-liter, 4-neck round bottom flask equipped with a stirrer, water-cooled reflux condenser, two addition funnels and a thermocouple. The water was heated to 80° C. with stirring and under a nitrogen gas blanket. A total of 6 grams of the monomer premix was added to the reactor over 2 minutes. A total of 0.2 grams of ammonium persulfate dissolved in 2 grams of water was then added over 1 minute to the reactor.

After stirring the reaction for 20 minutes, the remaining 599 grams of the monomer premix and 1.8 grams of ammonium persulfate dissolved in 167 grams of water were added simultaneously to the flask over 150 minutes. At the end of the monomer feed the reaction was maintained at 80° C. for an additional 60 minutes. An aliquot of 1.8 grams of t-butyl perocotate dissolved in 9 grams of Dowanol PM were added over 5 minutes as a chase initiator to the reactor. The reaction was held with stirring for an additional 60 minutes at 80° C. It was then allowed to cool to <40° C. A total of 9 grams of dimethylethanolamine in 28 grams of water was added over about 5 minutes. The contents of the flask were filtered and filled out into a suitable container. The final latex had a measured solids of 30%, a Z-average particle size of 175 nm, a Brookfield Viscosity of 20 centipoise (#4@60 rpm) and a bluish-white appearance.

Latex E Made with Ionic Polymerizable Surfactant

A total of 4.6 grams of Adeka Reasoap SR-10 was added to an Erlenmeyer flask with 153 grams of deionized water and stirred well. A total of 23 grams of glycidyl methacrylate, 139 grams of methyl methacrylate, 221 grams of ethyl acrylate, 22 grams of methacrylic acid and 40 grams of hydroxyethyl methacrylate were added in order to the Erlenmeyer while mixing well. The contents were mixed until the monomer emulsion showed no sign of separation upon standing. This is the monomer premix.

A total of 722 grams of deionized water was placed into a 3-liter, 4-neck round bottom flask equipped with a stirrer, water-cooled reflux condenser, two addition funnels and a thermocouple. The water was heated to 80° C. with stirring and under a nitrogen gas blanket. A total of 6 grams of the monomer premix was added to the reactor over 2 minutes. A total of 0.2 grams of ammonium persulfate dissolved in 2 grams of water was then added over 1 minute to the reactor.

After stirring the reaction for 20 minutes, the remaining 598 grams of the monomer premix and 1.8 grams of ammonium persulfate dissolved in 167 grams of water were added simultaneously to the flask over 150 minutes. At the end of the monomer feed the reaction was maintained at 80° C. for an additional 60 minutes. An aliquot of 1.8 grams of t-butyl perocotate dissolved in 9 grams of Dowanol PM were added over 5 minutes as a chase initiator to the reactor. The reaction was held with stirring for an additional 60 minutes at 80° C. It was then allowed to cool to <40° C. A total of 9 grams of dimethylethanolamine in 28 grams of water was added over about 5 minutes. The contents of the flask were filtered and filled out into a suitable container. The final latex had a measured solids of 29%, a volume weighted mean particle size of 145 nm, a Brookfield Viscosity of 22 centipoise (#4@60 rpm) and a bluish-white appearance.

Latex F Made with Mixed Non-Polymerizable Surfactant and Non-Ionic Polymerizable Surfactant A total of 5.7 grams of sodium dioctyl sulfosuccinate at 75% solids (AOT-75 from Cytec Solvay Group) and 11.4 grams of MAXEMUL 5010 was added to an Erlenmeyer flask with 323 grams of deionized water and stirred well. A total of 47 grams of glycidyl methacrylate, 279 grams of methyl methacrylate, 485 grams of ethyl acrylate, 45 grams of methacrylic acid, and 36 grams of hydroxyethyl acrylate were added in order to the Erlenmeyer while mixing well. The contents were mixed until the monomer emulsion showed no separation upon standing. This is the monomer premix.

A total of 1003 grams of deionized water was placed into a 5-liter, 4-neck round bottom flask equipped with a stirrer, water-cooled reflux condenser, two addition funnels and a thermocouple. The water was heated to 80° C. with stirring and under a nitrogen gas blanket. A total of 0.39 grams of ammonium persulfate dissolved in 3.9 grams of water was then added over 1 minute to the reactor. A total of 12 grams of the monomer premix was then added to the reactor over 2 minutes.

After stirring the reaction for 20 minutes, the remaining 1219 grams of the monomer premix and 3.5 grams of ammonium persulfate dissolved in 335 grams of water were added simultaneously to the flask over 150 minutes. At the end of the monomer feed the reaction was maintained at 80° C. for an additional 60 minutes. An aliquot of 0.9 grams of t-butyl peroctoate dissolved in 4.5 grams of Dowanol PM were added over 5 minutes as a chase initiator to the reactor. The reaction was held with stirring for an additional 60 minutes at 80° C. It was then allowed to cool to <40° C. A total of 18 grams of dimethylethanolamine in 55 grams of water was added over about 5 minutes. The contents of the flask were filtered and filled out into a suitable container. The final latex had a measured solids of 35%, a volume weighted mean particle size of 292 nm, a Brookfield Viscosity of 28 centipoise (#4@60 rpm) and a bluish-white appearance.

Latex G Made with Mixed Ionic and Non-Ionic Polymerizable Surfactants

A total of 10.7 grams of MAXEMUL 6106 and 3.6 grams of MAXEMUL 5010 was added to an Erlenmeyer flask with 288 grams of deionized water and stirred well. A total of 4 grams of ethylene glycol dimethacrylate, 262 grams of methyl methacrylate, 454 grams of ethyl acrylate, 42 grams of methacrylic acid, and 74 grams of hydroxyethyl acrylate were added in order to the Erlenmeyer while mixing well. The contents were mixed until the monomer emulsion showed no separation upon standing. This is the monomer premix.

A total of 1364 grams of deionized water was placed into a 5-liter, 4-neck round bottom flask equipped with a stirrer, water-cooled reflux condenser, two addition funnels and a thermocouple. The water was heated to 80° C. with stirring and under a nitrogen gas blanket. A total of 11 grams of the monomer premix was then added to the reactor over 2 minutes. A total of 0.37 grams of ammonium persulfate dissolved in 3.7 grams of water was then added over 1 minute to the reactor.

After stirring the reaction for 20 minutes, the remaining 1126 grams of the monomer premix and 3.3 grams of ammonium persulfate dissolved in 314 grams of water were added simultaneously to the flask over 150 minutes. At the end of the monomer feed the reaction was maintained at 80° C. for an additional 60 minutes. An aliquot of 3.3 grams of t-butyl peroctoate dissolved in 17 grams of Dowanol PM were added over 5 minutes as a chase initiator to the reactor. The reaction was held with stirring for an additional 60 minutes at 80° C. It was then allowed to cool to <40° C. A total of 17 grams of dimethylethanolamine in 52 grams of water was added over about 5 minutes. The contents of the flask were filtered and filled out into a suitable container. The final latex had a measured solids of 30%, a volume weighted mean particle size of 121 nm, a Brookfield Viscosity of 42 centipoise (#4@60 rpm) and a bluish-white appearance.

Latex H Made with Ionic Polymerizable Surfactant

A total of 11.4 grams of MAXEMUL 6106 was added to an Erlenmeyer flask with 323 grams of deionized water and stirred well. A total of 47 grams of glycidyl methacrylate, 279 grams of methyl methacrylate, 485 grams of ethyl acrylate, 45 grams of methacrylic acid and 36 grams of hydroxyethyl acrylate were added in order to the Erlenmeyer while mixing well. The contents were mixed until the monomer emulsion showed no sign of separation upon standing. This is the monomer premix.

A total of 989 grams of deionized water was placed into a 3-liter, 4-neck round bottom flask equipped with a stirrer, water-cooled reflux condenser, two addition funnels and a thermocouple. The water was heated to 80° C. with stirring and under a nitrogen gas blanket. A total of 12 grams of the monomer premix was added to the reactor over 2 minutes. A total of 0.4 grams of ammonium persulfate dissolved in 4 grams of water was then added over 1 minute to the reactor.

After stirring the reaction for 20 minutes, the remaining 1214 grams of the monomer premix and 3.5 grams of ammonium persulfate dissolved in 335 grams of water were added simultaneously to the flask over 150 minutes. At the end of the monomer feed the reaction was maintained at 80° C. for an additional 60 minutes. An aliquot of 3.6 grams of t-butyl peroctoate dissolved in 18 grams of Dowanol PM were added over 5 minutes as a chase initiator to the reactor. The reaction was held with stirring for an additional 60 minutes at 80° C. It was then allowed to cool to <40° C. A total of 18 grams of dimethylethanolamine in 55 grams of water was added over about 5 minutes. The contents of the flask were filtered and filled out into a suitable container. The final latex had a measured solids of 34%, a Z-average particle size of 130 nm, a Brookfield Viscosity of 40 centipoise (#4@60 rpm) and a bluish-white appearance.

Latex I Made with Ionic Polymerizable Surfactant

A total of 18.6 grams of Adeka Reasoap SR-10 was added to an Erlenmeyer flask with 323 grams of deionized water and stirred well. A total of 46 grams of glycidyl methacrylate, 277 grams of methyl methacrylate, 482 grams of ethyl acrylate, 44 grams of methacrylic acid and 35 grams of hydroxyethyl acrylate were added in order to the Erlenmeyer while mixing well. The contents were mixed until the monomer emulsion showed no sign of separation upon standing. This is the monomer premix.

A total of 989 grams of deionized water was placed into a 3-liter, 4-neck round bottom flask equipped with a stirrer, water-cooled reflux condenser, two addition funnels and a thermocouple. The water was heated to 80° C. with stirring and under a nitrogen gas blanket. A total of 12 grams of the monomer premix was added to the reactor over 2 minutes. A total of 0.4 grams of ammonium persulfate dissolved in 4 grams of water was then added over 1 minute to the reactor.

After stirring the reaction for 20 minutes, the remaining 1214 grams of the monomer premix and 3.5 grams of ammonium persulfate dissolved in 341 grams of water were added simultaneously to the flask over 150 minutes. At the end of the monomer feed the reaction was maintained at 80° C. for an additional 60 minutes. An aliquot of 3.6 grams of t-butyl peroctoate dissolved in 18 grams of Dowanol PM were added over 5 minutes as a chase initiator to the reactor. The reaction was held with stirring for an additional 60 minutes at 80° C. It was then allowed to cool to <40° C. A total of 18 grams of dimethylethanolamine in 55 grams of water was added over about 5 minutes. The contents of the flask were filtered and filled out into a suitable container. The final latex had a measured solids of 33%, a Z-average particle size of 139 nm, a Brookfield Viscosity of 50 centipoise (#4@60 rpm) and a bluish-white appearance.

Polyethylene-Acrylic Acid Dispersions

Dispersion J of Ionic Polyethylene-Acrylic Acid Copolymer in Water—50% Neutralization (TN)

A total of 600 grams of Primacor 5980i (from Dow Chemical Co.) was added to a 3-liter, 4-neck round bottom flask equipped with a stirrer, water-cooled reflux condenser and a thermocouple. A total of 20 grams of propylene glycol, 1305 grams of water and 74 grams of dimethylethanolamine were added to the flask and the contents were heated slowly to 92° C. with stirring and under a nitrogen gas blanket. The contents were held at 92° C. for two hours, at which time the contents were cooled to less than 60° C. with stirring. The contents were then filtered through a 5-micron bag into a suitable container. The final dispersion had a measured solids of 27% and a viscosity of 3333 centipoise (#4@60 rpm).

Dispersion K of Ionic Polyethylene-Acrylic Acid Copolymer in Water—50% TN

A total of 700 grams of Primacor 5980i was added to a 5-liter, 4-neck round bottom flask equipped with a stirrer, water-cooled reflux condenser and a thermocouple. A total of 35 grams of propylene glycol, 2678 grams of water and 87 grams of dimethylethanolamine were added to the flask and the contents were heated slowly to 92° C. with stirring and under a nitrogen gas blanket. The contents were held at 92° C. for two hours, at which time the contents were cooled to less than 60° C. with stirring. The contents were then filtered through a 5-micron bag into a suitable container. The final dispersion had a measured solids of 20%.

Latex—Ionic Polyethylene-Acrylic Acid Copolymer Blends

Blend L: 85% Latex H—15% Dispersion J Blend (85 to 15 Resin Solids Weight Ratio

A total of 471 grams of Latex H was placed into a 3-liter, 4-neck round bottom flask equipped with a stirrer, water-cooled reflux condenser and a thermocouple. The contents of the flask were heated to 70° C. with stirring under a nitrogen gas blanket. A total of 127 grams of Dispersion J was added dropwise to the contents of the flask over 30 minutes. The contents of the flask were then allowed to stir for 60 minutes at 70° C. and then cooled to less than 40° C. The contents of the flask were then filtered and poured into a suitable container. The final blend had a solids content of 33%.

Blend M: 85% Latex I—15% Dispersion J Blend

A total of 566 grams of Latex I was placed into a 3-liter, 4-neck round bottom flask equipped with a stirrer, water-cooled reflux condenser and a thermocouple. The contents of the flask were heated to 70° C. with stirring under a nitrogen gas blanket. A total of 130 grams of Dispersion J was added dropwise to the contents of the flask over 30 minutes. The contents of the flask were then allowed to stir for 60 minutes at 70° C. and then cooled to less than 40° C. The contents of the flask were then filtered and poured into a suitable container. The final blend had a solids content of 34%.

Blend N: 83% Latex F—17% Dispersion J Blend

A total of 501 grams of Latex F was placed into a 3-liter, 4-neck round bottom flask equipped with a stirrer, water-cooled reflux condenser and a thermocouple. The contents of the flask were heated to 70° C. with stirring under a nitrogen gas blanket. A total of 130 grams of Dispersion J was added dropwise to the contents of the flask over 30 minutes. The contents of the flask were then allowed to stir for 60 minutes at 70° C. and then cooled to less than 40° C. The contents of the flask were then filtered and poured into a suitable container. The final blend had a solids content of 34%.

Hybrid Latexes

Latex O:

A total of 5.5 grams of MAXEMUL 6106 was added to an Erlenmeyer flask with 154 grams of deionized water and stirred well. A total of 6 grams of benzoin, 230 grams of methyl methacrylate, 216 grams of ethyl acrylate and 14 grams of glycidyl methacrylate were added in order to the Erlenmeyer while mixing well. The contents were mixed until the monomer emulsion showed no sign of separation upon standing. This is the monomer premix.

A total of 1011 grams of Dispersion K along with 159 grams of water were placed into a 5-liter, 4-neck round bottom flask equipped with a stirrer, water-cooled reflux condenser, a thermocouple and two addition funnels. The contents of the flask were heated to 70° C. with stirring under a nitrogen gas blanket. The monomer premix described above and 4.6 grams of 35% hydrogen peroxide dissolved in 92 grams of water were added simultaneously in two separate streams to the flask over 150 minutes. At the end of the monomer feed the reaction was maintained at 70° C. for 30 minutes. An aliquot of 0.8 grams of 35% hydrogen peroxide dissolved in 16 grams of water was added over 20 minutes as a chase initiator to the reactor. The reaction was held with stirring for an additional 60 minutes at 80° C. A second aliquot of 0.8 grams of 35% hydrogen peroxide in 16 grams of water was added over 20 minutes. The reaction was held for another hour at 70° C. and was then allowed to cool to less than 40° C. The contents of the flask were filtered and filled out into a suitable container. The final latex had a measured solids of 35%.

Latex P:

A total of 691 grams of Dispersion K along with 213 grams of water, 0.7 grams of Adeka Reasoap SR-10 and 4 grams of benzoin dispersed in 2 grams of butyl Cellosolve were placed into a 3-liter, 4-neck round bottom flask equipped with a stirrer, water-cooled reflux condenser, a thermocouple and two addition funnels. The contents of the flask were heated to 70° C. with stirring under a nitrogen gas blanket. The monomer premix consisting of a blend of 165 grams of methyl methacrylate, 154 grams of ethyl acrylate and 10 grams of glycidyl methacrylate was placed in an addition funnel. A total of 3 grams of 35% hydrogen peroxide dissolved in 99 grams of water was placed in a second addition funnel. The monomer mixture and the hydrogen peroxide mixture were added simultaneously in two separate streams to the flask over 120 minutes. At the end of the monomer feed the reaction was maintained at 70° C. for 30 minutes. An aliquot of 0.6 grams of 35% hydrogen peroxide dissolved in 11 grams of water was added over 20 minutes as a chase initiator to the reactor. The reaction was held with stirring for an additional 60 minutes at 80° C. A second aliquot of 0.6 grams of 35% hydrogen peroxide in 11 grams of water was added over 20 minutes. The reaction was held for another hour at 70° C. and was then allowed to cool to less than 40° C. The contents of the flask were filtered and filled out into a suitable container. The final latex had a measured solids of 34% and a viscosity of 56 centipoise (#4@60 rpm).

Latex Q:

A total of 572 grams of Dispersion K along with 155 grams of water, 0.6 grams of AOT-75, 2 grams of MAXEMUL 5010 and 3 grams of benzoin dispersed in 3 grams of butyl Cellosolve were placed into a 3-liter, 4-neck round bottom flask equipped with a stirrer, water-cooled reflux condenser, a thermocouple and two addition funnels. The contents of the flask were heated to 70° C. with stirring under a nitrogen gas blanket. The monomer premix consisting of a blend of 132 grams of methyl methacrylate, 124 grams of ethyl acrylate and 8 grams of glycidyl methacrylate was placed in an addition funnel. A total of 3 grams of 35% hydrogen peroxide dissolved in 79 grams of water was placed in a second addition funnel. The monomer mixture and the hydrogen peroxide mixture were added simultaneously in two separate streams to the flask over 120 minutes. At the end of the monomer feed the reaction was maintained at 70° C. for 30 minutes. An aliquot of 0.5 grams of 35% hydrogen peroxide dissolved in 9 grams of water was added over 20 minutes as a chase initiator to the reactor. The reaction was held with stirring for an additional 60 minutes at 80° C. A second aliquot of 0.5 grams of 35% hydrogen peroxide in 9 grams of water was added over 20 minutes. The reaction was held for another 90 minutes at 70° C. and was then allowed to cool to less than 40° C. The contents of the flask were filtered and filled out into a suitable container. The final latex had a measured solids of 33% and a viscosity of 80 centipoise (#4@60 rpm).

Latex R:

A total of 572 grams of Dispersion K along with 154 grams of water, 1.9 grams of grams of MAXEMUL 5010 and 3 grams of benzoin dispersed in 3 grams of butyl Cellosolve were placed into a 3-liter, 4-neck round bottom flask equipped with a stirrer, water-cooled reflux condenser, a thermocouple and two addition funnels. The contents of the flask were heated to 70° C. with stirring under a nitrogen gas blanket. The monomer premix consisting of a blend of 132 grams of methyl methacrylate, 124 grams of ethyl acrylate and 8 grams of glycidyl methacrylate was placed in an addition funnel. A total of 3 grams of 35% hydrogen peroxide dissolved in 79 grams of water was placed in a second addition funnel. The monomer mixture and the hydrogen peroxide mixture were added simultaneously in two separate streams to the flask over 120 minutes. At the end of the monomer feed the reaction was maintained at 70° C. for 30 minutes. An aliquot of 0.5 grams of 35% hydrogen peroxide dissolved in 9 grams of water was added over 20 minutes as a chase initiator to the reactor. The reaction was held with stirring for an additional 60 minutes at 80° C. A second aliquot of 0.5 grams of 35% hydrogen peroxide in 9 grams of water was added over 20 minutes. The reaction was held for another 90 minutes at 70° C. and was then allowed to cool to less than 40° C. The contents of the flask were filtered and filled out into a suitable container. The final latex had a measured solids of 34% and a viscosity of 180 centipoise (#4@60 rpm).

Latex S Made with Ionic Polymerizable Surfactant

A total of 8 grams of MAXEMUL 6106 was added to an Erlenmeyer flask with 168 grams of deionized water and stirred well. A total of 139 grams of methyl methacrylate, 240 grams of ethyl acrylate, 27 grams of methacrylic acid and 40 grams of hydroxyethyl methacrylate were added in order to the Erlenmeyer while mixing well. The contents were mixed until the monomer emulsion showed no sign of separation upon standing. This is the monomer premix.

A total of 708 grams of deionized water was placed into a 5-liter, 4-neck round bottom flask equipped with a stirrer, water-cooled reflux condenser, two addition funnels and a thermocouple. The water was heated to 80° C. with stirring and under a nitrogen gas blanket. A total of 0.2 grams of ammonium persulfate dissolved in 20 grams of water was added over 1 minute to the reactor. A total of 6 grams of the monomer premix was then added to the reactor over 2 minutes.

After stirring the reaction for 20 minutes, the remaining 616 grams of the monomer premix and 1.8 grams of ammonium persulfate dissolved in 176 grams of water were added simultaneously to the flask over 150 minutes. At the end of the monomer feed the reaction was maintained at 80° C. for an additional 60 minutes. An aliquot of 0.5 grams of ammonium persulfate dissolved in 2.3 grams of water were added over 5 minutes as a chase initiator to the reactor. The reaction was held with stirring for an additional 60 minutes at 80° C. It was then allowed to cool to <40° C. A total of 11 grams of dimethylethanolamine in 33 grams of water was added over about 5 minutes. The contents of the flask were filtered and filled out into a suitable container. The final latex had a measured solids of 29.5%, a Z-average particle size of 124 nm, a Brookfield Viscosity of 76 centipoise (#4@60 rpm) and a bluish-white appearance.

Coating Examples

The properties of the coatings were tested via the following methods. Results are also shown in Tables 1-2. The acetic acid sterilization test was performed on all the coatings. The results are shown in Tables A-B.

Test Methods

Test Panel Preparation:

The coating samples were applied onto an ETP panel using a wire wound bar coater to give a 7-9 g/square meter dried coating weight. The substrates were cleaned by MEK before application. The coated panels were stoved in a conveyor oven with 3 controllable heating zones at the following temperature settings: zone 1 145° C.; zone 2 220° C.; zone 3 220° C. at a conveyor speed setting of 2.30 to give a time of 6 minutes.

MEK Rub Test:

The number of reciprocating rubs required to remove the coating was measured using a ball of cotton wool soaked in methyl ethyl ketone (MEK).

Wedge Bend Test:

A 10 cm×4 cm coated panel was bent on a 6 mm steel rod to form a U-shaped strip 10 cm long and 2 cm wide. The U-shaped strip was then placed onto a metal block with a built in tapered recess. A 2 kg weight was dropped onto the recessed block containing the U-shaped strip from a height of 60 cm in order to from a wedge. The test piece was then immersed in a copper sulphate ($CuSO_4$) solution acidified with hydrochloric acid (HCl) for 2 minutes, followed by rinsing with tap water. The sample was then carefully dried by blotting any residual water with tissue paper. The length of coating without any fracture was measured. The result was quoted in mm passed. The wedge bends were tested in triplicate and the average value was quoted. That is, the results indicate the mm of the 100 mm coating surface that remained in-tact or unbroken upon deformation. A result of 98 therefore means that only 2 mm of the coating out of 100 mm cracked upon deformation.

Acetic Acid Sterilization:

This test was used to determine if the coatings are compatible for use in beverage containers. The coating samples were applied onto aluminum can plate using a wire wound bar coater to give a 7-9 g/square meter dried coating weight. The substrates were cleaned by MEK before application. The coated panels were stoved in a conveyor oven with the following settings: zone 1 145° C.; zone 2 215° C.; zone 3 215° C. and conveyor setting 3.30 to give a through time of 4 minutes.

The coated panels were immersed in a deionized water solution comprising 5% acetic acid inside a Kilner jar and sterilized for 30 minutes at 100° C. in an autoclave. After this time, the coated panels were quickly removed while still hot and rinsed with cold tap water. The portion of the coated panel immersed in acetic acid, was assessed for extent of damage. Five aspects were graded by visual assessment on a scale where 0=no damage and 5=severe damage/defect:
  (A) Gloss surface modification
  (B) Extent of blushing wherein the coating turns hazy due to water trapped in the coating
  (C) Extent of color wherein the coating turns into another color (D) Coating adhesion loss (assessed by making a cross hatch on the coating and taping with Scotch 610 tape)
(E) Blistering of the coating Sample Preparation and Testing for Examples 1-10

Coating Example 1

20 g of coating sample 1 were prepared by adding 3.95 g of deionized water and 2.60 g of a mix of butanol and pentanol in a 3 to 1 ratio (i.e. 1.95 g of butanol and 0.65 g of pentanol) to 13.45 g of latex S, made as described above. The mixtures were stirred manually. No PRIMID XL-552 was used in this coating.

Coating Examples 2-5

20 g of coating samples 2-5 were prepared by adding 0.18 g of PRIMID XL-552 to 13.26 g of latex S in an amount shown in Table 1. This mixture was stirred manually; then 3.96 g of deionized water and 2.60 g of the butanol/pentanol (3/1) mix were added. Formulation of the coatings was completed using the components and amounts also shown in Table 1.

Coating Examples 6-10

20 g of coating samples 6-10 were prepared by adding a 10% solution of phosphoric acid drop by drop and PRIMID XL-552 to 13.26 g of latex S in an amount shown in Table 2. This mixture was stirred manually; then 3.91 g of deionized water and 2.60 g of the butanol/pentanol (3/1) mix were added. Formulation of the coatings was completed using the components and amounts also shown in Table 2.

TABLE 1

Coating Examples 1-5 and Test Results

|  | Coating 1 | Coating 2 | Coating 3 | Coating 4 | Coating 5 |
|---|---|---|---|---|---|
| Latex S | 13.45 | 13.26 | 13.07 | 12.70 | 12.36 |
| PRIMID XL-552[1] | 0.00 | 0.18 | 0.36 | 0.72 | 1.06 |
| 2-butoxyethanol/pentanol (3/1) | 2.60 | 2.60 | 2.60 | 2.60 | 2.60 |
| Deionized water | 3.95 | 3.96 | 3.96 | 3.98 | 3.99 |
| Total Results | 20.00 | 20.00 | 20.00 | 20.00 | 20.00 |
| MEK Rubs | 6 | 12 | 15 | 7 | 13 |
| Wedge Bend | 96.3 | 95.3 | 97.3 | 97.3 | 93 |

[1]Hydroxyalkylamide.

TABLE 2

Coating Examples 6-10 and Test Results

|  | Coating 6 | Coating 7 | Coating 8 | Coating 9 | Coating 10 |
|---|---|---|---|---|---|
| Latex S | 13.26 | 13.26 | 12.98 | 12.70 | 12.70 |
| PRIMID XL-552 | 0.17 | 0.17 | 0.41 | 0.66 | 0.66 |
| Phosphoric acid[‡] | 0.08 | 0.15 | 0.11 | 0.08 | 0.15 |
| 2-butoxyethanol/pentanol (3/1) | 2.60 | 2.60 | 2.60 | 2.60 | 2.60 |
| Deionized water | 3.91 | 3.88 | 3.89 | 3.91 | 3.87 |
| Total Results | 20.02 | 20.06 | 20.00 | 19.95 | 19.99 |
| MEK Rubs | 6 | 10 | 10 | 80 | 27 |
| Wedge Bend | 81.7 | 77.3 | 81.7 | 80.3 | 79 |

[‡]10 weight % of o-phosphoric acid in deionized water and neutralized at 50% by dimethylethanolamine (DMAE).

TABLE A

Results of Acetic Acid Sterilization Test on Coatings 1-5

|  |  | Coating 1 | Coating 2 | Coating 3 | Coating 4 | Coating 5 |
|---|---|---|---|---|---|---|
| 5% Acetic acid | A | 2 | 1 | 0-1 | 0-1 | 1 |
|  | B | 2-3 | 2 | 1-2 | 1-2 | 1-2 |
|  | C | 0 | 0 | 0 | 0 | 0 |
|  | D | 2 | 3 | 3 | 1-2 | 2 |
|  | E | 3 | 5 | 5 | 5 | 5 |

TABLE B

Results of Acetic Acid Sterilization Test on Coatings 6-10

|  |  | Coating 6 | Coating 7 | Coating 8 | Coating 9 | Coating 10 |
|---|---|---|---|---|---|---|
| 5% Acetic acid | A | 0-1 | 0-1 | 0-1 | 0 | 0-1 |
|  | B | 2 | 1 | 1 | 0-1 | 0-1 |
|  | C | 0 | 0 | 0 | 0 | 0 |
|  | D | 0-1 | 0 | 1 | 0 | 1 |
|  | E | 2 | 5 | 5 | 0 | 1 |

The above examples demonstrate that coatings made from a latex polymer prepared with a polymerizable surfactant and an emulsion monomer are suitable for use on packaging but that the use of a phosphorus acid in combination with an adapted crosslinker in the latex stabilized by polymerizable surfactant results in a notable improvement of the chemical resistance of the film formed. Moreover, with the appropriate choice of surfactant and the amount of added phosphoric acid and crosslinker, an excellent flexibility of the coatings is also demonstrated; such flexibility is particularly desired for packaging applications.

Sample Preparation and Testing for Examples 11-20

Sample Preparation:
Ten latex polymers were examined for use as a coating for the lids of metal beverage cans. The latex polymers were varied based on polymer type and the surfactant type.

Each latex polymer was placed into an appropriately sized container. To the container was added enough deionized water to bring the final solids of the formulated polymer to 29%. The mixture was agitated using an overhead air supplied stirrer attached with a paddle blade. While the mixture was under agitation, 10% on polymer weight solids of ethylene glycol mono-2-ethylhexyl ether (purchased from Eastman as Ektasolve EEH) was added and allowed to incorporate. After the addition of the Ektasolve EEH, 4% on solids of the phenolic crosslinker HRJ-13078 (purchased from SI Group) was added and allowed to incorporate. After the addition of the crosslinker, 0.1% on solids of a blocked dodecylbenzene sulfonic acid (purchased from King Industries as NACURE 5925) was added and held under agitation until the resulting mixture became homogenous.

The resulting mixtures (Examples 11-20) were drawn down on 0.0088" zirconium treated aluminum substrate with wire wound rods to a wet film thickness of 27 microns. The films were baked for 10 seconds in a 290° C. conveyor oven. The substrate reached a peak metal temperature of 450° F. (232° C.).

Testing Methods:

After baking, the resulting coatings were checked for MEK solvent resistance as described above.

The final coatings were also evaluated using various simulant soak tests in order to determine the coatings' resistance to the different solutions.

The "Acetic Acid" test uses a boiling 3% acetic acid solution. The solution is prepared by mixing 90 grams of glacial acetic acid (product of Fisher Scientific) into 3000 grams of deionized water. Coated strips are partially immersed into the boiling acetic acid solution for 30 minutes.

The "Dowfax" test uses a boiling 0.17% solution of Dowfax 2A1 (product of Dow Chemical). The solution is prepared by mixing 5.65 g of Dowfax 2A1 into 3000 grams of deionized water. Coated strips are partially immersed into the boiling Dowfax solution for 10 minutes.

The "Joy" test uses a 1% solution of Ultra Joy dishwashing liquid. The solution is prepared by mixing 30 g of Ultra Joy into 3000 grams of deionized water. Coated strips are partially immersed into a 180° F. (82° C.) Joy solution for 10 minutes.

The "Water Retort" test uses coated strips that are placed into a wide-mouth quart sized mason jar. The coated strips are partially immersed using deionized water. The mason jar is then sealed using a piece of heavy-duty aluminum foil. The sealed mason jar is placed into an autoclave (such as an EZ11 Plus from Tuttnauer) and allowed to reach 250° F. (121° C.) and held at that temperature for 30 minutes.

After the individual tests are completed, the coated strips are then rinsed and cooled in deionized water, dried, and immediately rated for blister, blush and adhesion as described below.

Blister resistance is a Pass/Fail test. Each panel was visually inspected for the presence of blistering. Blistering is evidenced by the formation of bubbles in the coating during the Acetic Acid, Dowfax, and Water Retort tests. A Pass rating is given if there is no detectable blistering of the coating.

Blush resistance measures the ability of a coating to resist attack by various testing solutions. When the coated film absorbs test solution, it generally becomes cloudy or looks white. Blush is measured visually using a scale of 1-10 where a rating of "10" indicates no blush and a rating of "0" indicates complete whitening of the film. The coated panel tested is 2×4 inches (5×10 cm) and the testing solution covers half of the panel being tested so you can compare blush of the exposed panel to the unexposed portion.

Immediately after measuring the Blush resistance, the adhesion of the coated panels were checked using ASTM D3359 Method B "Standard Test Methods for Measuring Adhesion by Tape Test". The adhesive tape used is Scotch Packaging Tape 610. The crosshatch pattern of cuts is made over the liquid/air interface on the coated panel. The results are recorded as Pass/Fail. Any amount of coating removal by the adhesive tape is considered as a Fail.

The panels for the Wedge Bend test were made using a BYK-Gardner "Coverall" Bend and Impact Tester. A 2×4 inch (5×10 cm) coated test panel is first bent double over the ⅛" rod so that the coated surface is on the outside. The bent panel is placed between the parts of the hinge. The impact tool, flat face down, is dropped from a height needed to deliver 40 inch-pounds of impact force onto the upper part of the hinge. The impacted test panel will have a wedge shape where one end of the coated metal impinged upon itself and a ⅛ inch space remained on the opposite end.

After completing the wedge bend, the panels are submerged in a copper sulfate solution (70% water, 20% copper sulfate, 10% hydrochloric acid) for 15 seconds. The panels are then removed from the solution, rinsed with deionized water, dried, and immediately rated. The copper sulfate solution will etch any area of the panel where the coating has cracked and failed. The etched wedge bent panels were then examined through a microscope at 20× power to determine how far from the impinged end along the bent radii did the coating crack. Wedge Bend results are reported as the percentage of cracked area versus total length of the wedge bent panel.

The results of the testing are reported in Table 3.

TABLE 3

| Ex. | Latex | Surfactant | Polymer Type | MEK | Wedge Bend (Average of 3 Tests) | Acetic Acid Blush | Acetic Acid Adh | Acetic Acid Blister | Dowfax Blush | Dowfax Adh | Dowfax Blister | Joy Blush | Joy Adh | Water Retort Blush | Water Retort Adh | Water Retort Blister |
|---|---|---|---|---|---|---|---|---|---|---|---|---|---|---|---|---|
| 11 | D | Maxemul 6106 | Latex | 11 | 27 | 8 | F | F | 8 | F | P | 9 | F | 9 | P | P |
| 12 | L | Maxemul 6106 | Blend | 100 | 16 | 7 | P | F | 8 | P | P | 8 | P | 8 | P | P |
| 13 | O | Maxemul 6106 | Hybrid | 84 | 21 | 6 | P | P | 9 | P | P | 9 | P | 8 | P | P |
| 14 | E | Reasoap SR10 | Latex | 32 | 29 | 7 | P | F | 8 | P | P | 9 | P | 9 | P | P |
| 15 | M | Reasoap SR10 | Blend | 100 | 21 | 6 | P | F | 8 | P | P | 8 | P | 6 | P | P |
| 16 | P | Reasoap SR10 | Hybrid | 44 | 18 | 6 | P | P | 8 | P | P | 9 | P | 8 | P | P |
| 17 | F | AOT-75/ Maxemul 5010 | Latex | 61 | 25 | 8 | P | P | 8 | P | P | 8 | P | 9 | P | P |
| 18 | N | AOT-75/ Maxemul 5010 | Blend | 100 | 25 | 4 | P | P | 7 | P | P | 7 | P | 4 | P | P |
| 19 | Q | AOT-75/ Maxemul 5010 | Hybrid | 63 | 25 | 4 | P | P | 9 | P | P | 9 | P | 8 | P | P |
| 20 | R | Maxemul 5010 | Hybrid | 100 | 20 | 4 | P | P | 9 | P | P | 9 | P | 9 | P | P |

Whereas particular embodiments of this invention have been described above for purposes of illustration, it will be evident to those skilled in the art that numerous variations of the details of the present invention may be made without departing from the invention as defined in the appended claims.

Although various embodiments of the invention have been described in terms of "comprising", embodiments consisting essentially of or consisting of are also within the scope of the present invention.

The invention claimed is:

1. A package with a coating composition deposited on at least a portion thereof wherein the coating composition comprises:
   (a) a latex polymer comprising the emulsion polymerization product of
      (i) an emulsion monomer component comprising at least one ethylenically unsaturated monomer polymerized in the presence of
      (ii) a surfactant that is polymerizable with the at least one ethylenically unsaturated monomer;
   (b) a curing agent, wherein the curing agent comprises a hydroxyalkylamide and/or a hydroxyalkylurea; and
   (c) a phosphorus acid.

2. The package of claim 1 in which the polymerizable surfactant is polymeric.

3. The package of claim 1 in which the polymerizable surfactant contains a polymerizable group comprising vinyl, allyl, (meth)acryl and/or alkenyl.

4. The package of claim 1 in which the polymerizable surfactant comprises a hydrophobic group and a hydrophilic group.

5. The package of claim 4 in which the hydrophobic group comprises $C_8$-$C_{50}$ alkyl.

6. The package of claim 4 in which the hydrophilic group comprises an ionic salt group or a poly(oxyethylene) group.

7. The package of claim 1 in which the polymerizable surfactant is non-ionic, ionic, or anionic.

8. The package of claim 1 in which the polymerizable surfactant is nonionic and is present in combination with an anionic surfactant.

9. The package of claim 7 in which the polymerizable surfactant is anionic and the anionic group comprises sulfonate, phosphonate and/or carboxylate.

10. The package of claim 1 in which the polymerizable surfactant comprises the structure:

$$R_1-CH=C(R_1)-(A)_m-(CH_2)_n-(O)_p-(R_3-O)_q-X$$
with $R_2$ substituent where $R_1$ is independently H, $C_1$ to $C_{30}$ alkyl group $$-C(=O)-OR_4$$

where $R_4$ is $C_1$ to $C_{30}$ alkyl,
A is $$-CH_2-C(=O)-O-, \quad -C(=O)-O-, \quad -O-,$$

$$-CH_2-O-, \quad -CH_2-O-CH_2- \text{ or } Ar,$$

Ar is a divalent aromatic group,
m is 0 to 1,
$R_2$ is H, an alkyl group containing at least 8 carbon atoms,
n is 0 to 30,
p is 0 to 1,
q is 2 to 250,
$R_3$ is $-C_2H_4-$, including mixtures with $-C_3H_7-$, and
X is an ionic salt group or an alkyl group.

11. The package of claim 10 where
   a) $R_1$ is independently H or $CH_3$,
      A is $-CH_2-O-CH_2-$,
   m is 1,
   $R_2$ is an alkyl group containing at least 8 carbon atoms,
   n is 1,
   p is 1,
   $R_3$ is $-C_2H_4-$,
   q is 2 to 30, and
   X is sulfonate or phosphonate.

12. The package of claim 1 in which the emulsion monomer component comprises a mixture of polymerizable ethylenically unsaturated monomers.

13. The package of claim 1 in which the emulsion monomer component comprises ethylenically unsaturated monomers selected from alkyl (meth)acrylates, hydroxyalkyl (meth)acrylates and epoxy group-containing ethylenically unsaturated monomers and combinations thereof.

14. The package of claim 1 in which the ethylenically unsaturated monomers are free of styrene and/or epoxy group-containing ethylenically unsaturated monomers.

15. The package of claim 1 in which the coating composition is substantially free of bisphenol A and bisphenol A diglycidyl ether (BADGE).

16. The package of claim 1 in which the coating composition does not release formaldehyde upon curing.

17. The package of claim 1 in which the coating composition further comprises
   (d) a polar polyolefin.

18. The package of claim 17 in which
   the polar polyolefin comprises a polyethylene (meth)acrylic acid copolymer and is present in the composition in amounts of 5 to 50 percent by weight based on resin solids weight of the coating composition.

19. The package of claim 1 which is a metal can.

20. The package of claim 1 in which the coating composition is applied as a top coat over a basecoat of the same or different composition.

21. A method comprising:
   (a) applying the coating composition of claim 1 to a substrate prior to or after forming the substrate into a package; and
   (b) heating the coated substrate to a temperature and for a time sufficient to cure the coating composition.

22. The method of claim 21 wherein the package is a metal can.

23. The package of claim 10 where
   b) $R_1$ is independently H or $CH_3$,
      A is $$R_4-\text{(phenyl ring)}$$

where $R_4$ is an alkyl group having at least 8 carbon atoms,
m is 1,
n is 0,
p is 1,
$R_3$ is —$C_2H_4$—,
q is 2 to 40, and
X is sulfonate or phosphonate.

24. The package of claim 10 where
c) $R_1$ is independently H or $CH_3$,
A is —$CH_2$—O—,
m is 1,
$R_2$ is an alkyl group having at least 8 carbon atoms,
n is 1,
p is 1,
$R_4$ is —$C_2H_4$—,
q is 2 to 40, and
X is sulfonate or phosphonate.

25. The package of claim 10 where
d) $R_1$ is independently H or $C_1$ to $C_{30}$ alkyl,
m is 0,
$R_2$ is H,
n is 6 to 10,
p is 1,
q is 5 to 40,
$R_3$ is —$C_2H_4$—, and
X is $C_1$ to $C_4$ alkyl.

26. The package of claim 1, in which the phosphorus acid is phosphoric acid.

27. The package of claim 26, wherein the phosphoric acid comprises 0.1 to 1.0 percent by weight based on total resin solids of the coating composition.

\* \* \* \* \*